(12) United States Patent
Steinbach et al.

(10) Patent No.: US 6,804,538 B2
(45) Date of Patent: Oct. 12, 2004

(54) SYSTEM AND METHOD FOR INTERFACING A WIRELESS TELEPHONE TO A PERSONAL COMPUTER

(75) Inventors: Holger Steinbach, Round Rock, TX (US); Alan Aguais, Round Rock, TX (US); Elie Jreij, Pflugerville, TX (US); Larry Coons, Cedar Park, TX (US); Deborah Franklin, Corinth, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 62 days.

(21) Appl. No.: 10/001,159

(22) Filed: Oct. 31, 2001

(65) Prior Publication Data

US 2003/0083099 A1 May 1, 2003

(51) Int. Cl.[7] .................................. H04M 1/00
(52) U.S. Cl. ............... 455/557; 455/420; 455/412.1
(58) Field of Search ................ 455/556.1, 557, 455/567, 550.1, 73, 74.1, 420, 566, 422.1, 412.1; 379/102.3, 102.1, 102.2, 106.1

(56) References Cited

U.S. PATENT DOCUMENTS

| | | | |
|---|---|---|---|
| 5,446,783 A | 8/1995 | May | 379/59 |
| 5,796,394 A | 8/1998 | Wicks et al. | 345/329 |
| 5,917,905 A | 6/1999 | Whipple et al. | 379/356 |
| 5,956,651 A | 9/1999 | Willkie et al. | 455/553 |
| 5,974,311 A | 10/1999 | Lipsit | 455/418 |
| 6,058,104 A | 5/2000 | Snelling et al. | 370/277 |
| 6,289,213 B1 * | 9/2001 | Flint et al. | 455/420 |
| 6,308,062 B1 * | 10/2001 | Chien et al. | 455/420 |
| 6,697,467 B1 * | 2/2004 | Schultz et al. | 379/102.03 |

FOREIGN PATENT DOCUMENTS

| | | | | |
|---|---|---|---|---|
| GB | 2 343 082 A | * | 4/2000 | H04M/19/04 |
| WO | 0025501 | | 5/2000 | |

* cited by examiner

*Primary Examiner*—Sonny Trinh

(57) ABSTRACT

A telecommunications system includes a wireless telephone (14) and a personal computer (18) having a wireless telephone interface (24). The wireless telephone (14) is equipped with a personal computer (PC) function key (22) for activating PC controlled functionality. More particularly, when the PC function key (22) is activated, the wireless telephone (14) signals the PC it is ready to receive PC controlled functions. Thus, a menu of options may be transmitted from the PC (18) to the wireless telephone. The user clicks the desired selection to activate or interact with the corresponding program on the personal computer (18).

23 Claims, 4 Drawing Sheets

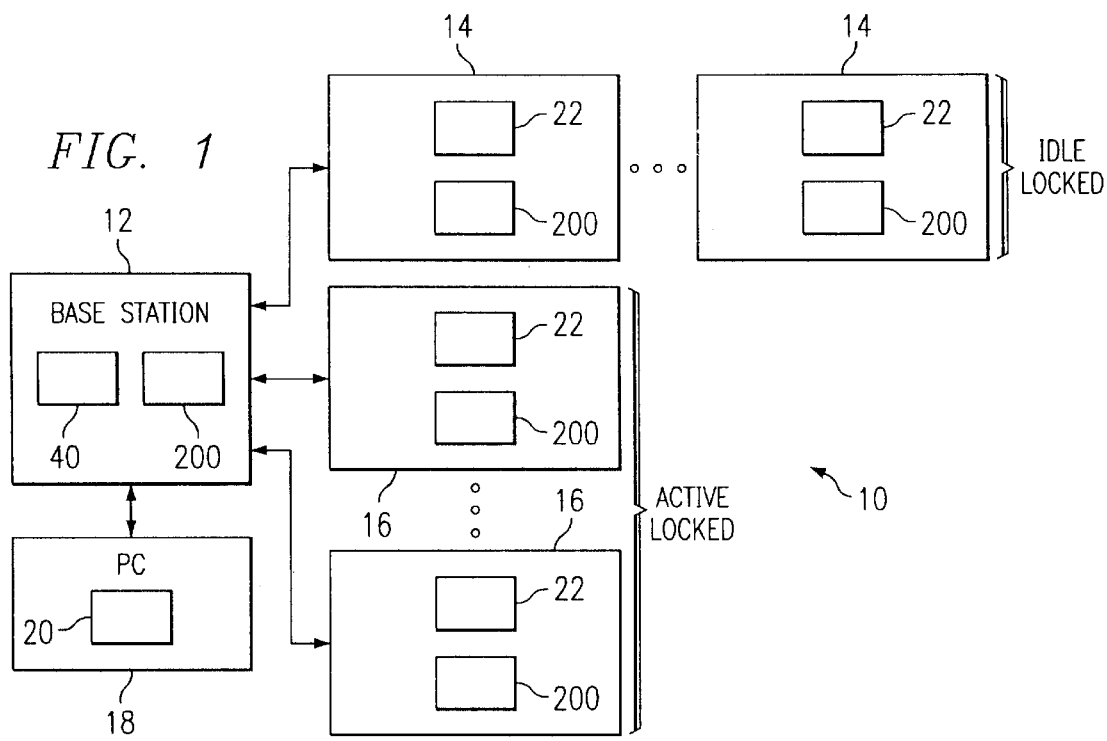

US 6,804,538 B2

SYSTEM AND METHOD FOR INTERFACING A WIRELESS TELEPHONE TO A PERSONAL COMPUTER

BACKGROUND OF THE INVENTION

The present invention relates to telecommunications systems and, in particular, to an improved method for interfacing a wireless telephone to a computer system.

The convergence of voice and data communications is proceeding rapidly. Wireless telecommunications systems are an increasingly important aspect of such systems. In such systems, wireless telecommunications devices, such as cordless telephones or cellular (or PCS) telephones, can be used as a replacement for conventional telephone systems, as well as for voice mail retrieval and text (e-mail) retrieval and display. The underlying host for the e-mail, however, is typically a personal computer. Such devices typically use an alphanumeric display as a user interface and to retrieve text messages.

Thus, the uses of such device, and their dependency upon easy-to-use user interfaces in become increasingly important. However, the size and configuration of wireless telecommunications devices have become relatively smaller, resulting in improved portability but a smaller user interface.

As such, there is a need for an improved wireless telephone with improved connectivity and user interface to a personal computer.

SUMMARY OF THE INVENTION

These disadvantages in the prior art are overcome in large part by a system and method according to the present invention.

A telecommunications system according to an embodiment of the present invention includes a wireless telephone and a personal computer having a wireless telephone interface. The wireless telephone is equipped with a personal computer (PC) function key for activating PC controlled functionality. More particularly, when the PC function key is activated, the wireless telephone signals the PC it is ready to receive PC controlled functions. Thus, a menu of options may be transmitted from the PC to the wireless telephone. The user clicks the desired selection to activate or interact with the corresponding program on the personal computer.

A wireless communications device according to an embodiment of the present invention includes a personal computer wireless interface for communicating with a personal computer, which is also equipped with a wireless communication device or card. According to one embodiment of the invention, one or more function keys on the wireless communications device activate a menu on the cordless device. Selection of one of the options on the menu activates a corresponding program on the associated personal computer. The programs may interface functionality with the wireless communications device, such as e-mail or Internet browsing, or the programs may be associated only with the personal computer.

A telecommunication system according to an embodiment of the present invention includes a cordless telephone system having at least one mobile station and at least one base station, and at least one personal computer adapted to communicate with associated cordless mobile stations. The mobile stations are adapted to interface with the personal computer via at least one function key. The function key activates one or more programs on the personal computer. The programs may further interact with the mobile station or may be associated only with the personal computer.

A method according to an embodiment of the present invention includes activating a PC interface key on a cordless telephone. The PC key causes a menu to be displayed on a graphical user interface on the cordless telephone. The menu displays program selections of a computer associated with the cordless telephone. Selecting one of the menu choices activates the computer program.

A method according to another embodiment of the present invention includes providing a wireless PC interface on a wireless telephone. The PC wireless interface is able to be activated by a function key. The function key causes a display of program selections on the associated PC. The programs are then controlled by the cordless telephone.

BRIEF DESCRIPTION OF THE DRAWINGS

A better understanding of the invention is obtained when the following detailed description is considered in conjunction with the following drawings in which:

FIG. 1 is a diagram of a telecommunications system according to an embodiment of the present invention;

FIG. 2 is a diagram illustrating communication between a portable part and a personal computer;

FIG. 3 is a block diagram of a portable part according to an embodiment of the present invention;

DETAILED DESCRIPTION OF THE INVENTION

Figure 4:
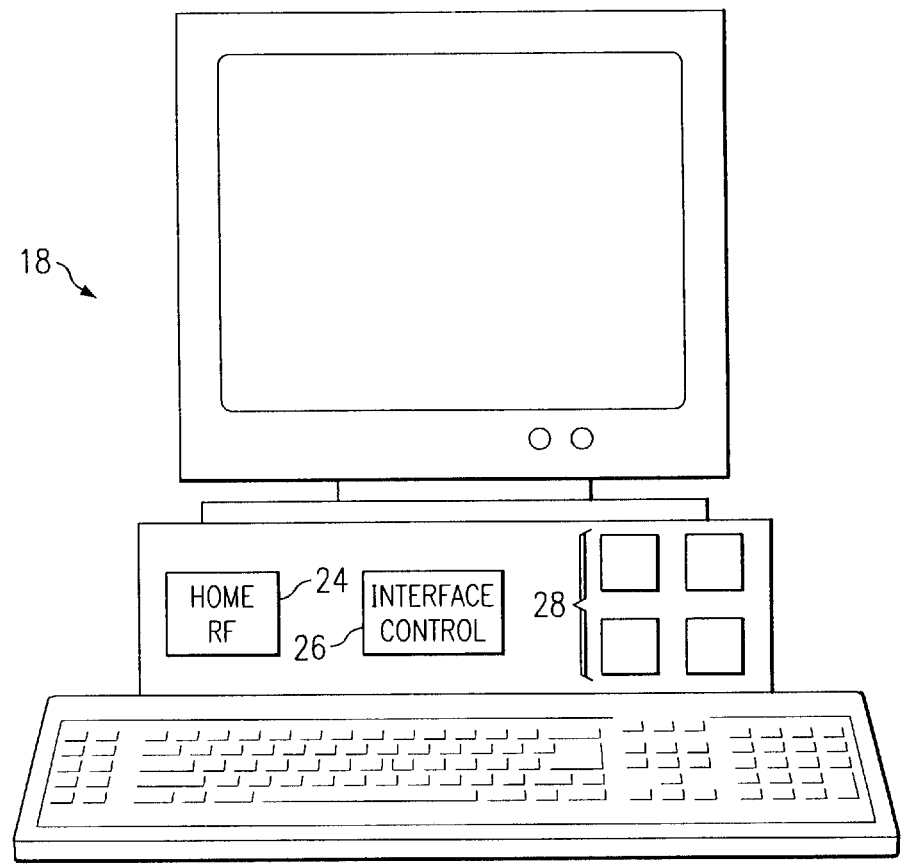
FIG. 4 is a block diagram of a personal computer according to an embodiment of the present invention.

Turning now to the drawings and, with particular attention to FIG. 1, a diagram of a telecommunications system according to an embodiment of the present invention is shown and generally identified by the reference numeral 10. In particular, the system may be implemented as a frequency hopping cordless telephone system, indicated generally as 10. System 10 includes one or more base stations 12, each of which can also be referred to as a fixed part (FP). Each base station 12 can support communication with a plurality of handsets 14 and handsets 16 using radio frequencies. Handsets 14 and handsets 16 can also be referred to as portable parts (PP). The system 10 further includes one or more personal computers 18, which includes an interface 20 for communicating with the base station 12 and/or the portable parts 14, 16. The interface 20 may be a Home RF compatible interface. The personal computer 20 may communicate with the portable parts 14, 16 via the base station 12 or directly.

The base station 12 and the handsets 14 and 16 further include a PC interface 22 and user interface 200, as will be described in greater detail below. An exemplary system suitable for use with a receiver according to the present invention is the Gigaset™ system, available from Siemens Information and Communication Mobile LLC.

In operation, base station 12 can support a defined total number of handsets 14 and 16. For example, in one implementation, base station 12 can support a total of eight handsets, either idle locked or active locked. Of the total number of handsets, a given number 'M' can be active locked handsets 16. For example, base station 12 could support up to four active locked handsets 16 from the eight total handsets. Of the remaining handsets, base station 12 can support a given number "N' of idle locked handsets 14. For example, "N" can be less than or equal to the difference between the total number of supported handsets (e.g., 8) and the number "M" of active locked handsets 16 (e.g., 0–4). Idle locked handsets 14 are handsets that are currently inactive but are in contact with and in sync with base station 12.

Base station 12 can communicate with handsets 14 and handsets 16 using a time division multiplexed (TDM) frame-based communication protocol. For example, each frame can be ten milliseconds (10 ms) in duration and can include transmit and receive channels for communication and control data. One protocol used with digital cordless telephone systems is the Digital Enhanced Cordless Telecommunications (DECT) protocol, which is the pan-European standard for digital cordless systems and supports up to six locked handsets 16 (i.e., M=6). There are, of course, other protocols used for communicating across the air interface between base station 12 and handsets 14 and handsets 16. For example, the DECT protocol can be modified to support up to four locked handsets 16 (i.e., M=4), each with enhanced communication features due to higher data rates. In other embodiments, the system may implement the Home RF standard, which is based on the DECT standard.

In the implementation of FIG. 1, system 10 uses an ISM band of radio frequencies for supporting communication between base station 12 and handsets 14 and 16. For example, system 10 can use the ISM band extending from 2.4 GHz to 2.4835 GHz. An advantage of using the ISM band is that it is unlicensed and does not require a license fee for use. However, in order to operate within FCC or other government regulations, system 10 implements a frequency hopping scheme. This allows system 10 to support robust cordless communications in the ISM band while operating within regulation guidelines. Under the frequency hopping scheme, base station 12 and handsets 14 and 16 move in the time domain from frequency to frequency. Because of the changing frequency, handsets are initially in an unlocked state when entering an area serviced by base station 12. Unlocked handsets can then "listen" at a specific radio frequency to attempt to lock on to base station 12. When base station 12 hops to that specific frequency, unlocked handsets can identify and receive control data transmitted by base station 12. This allows unlocked handsets to lock with base station 12 and sync with the frequency hopping scheme.

Once locked, the handsets 14, 16 may communicate with the personal computer 18, either directly or via the base station 12, as will be described in greater detail below. In particular, FIG. 2 illustrates a system for PC-cordless phone interaction according to an embodiment of the present invention. Shown is a portable part 14 and a personal computer 18. The handset 14 includes a PC function key 22. Selection of the function key 22 activates a menu 200, which may be on an LCD screen, for example. The menu 200 displays a list 200a–200n which correspond to programs 28a–28n on the PC 18 with which the handset 14 may interact. For example, the programs 28a–28n may be e-mail programs or web browser programs, and the like.

The user selects the program from the menu 200 and the handset 14 sends a signal via the PC interface 24 (FIG. 1) to the personal computer 18. In response, the personal computer 18 activates the corresponding program. The program may further interact with the handset 14, or may perform standalone functions. If the program is an e-mail program, for example, the e-mail program will open, check for messages, and transmit the messages to the portable part. In an alternative embodiment, the e-mail program or PC sends only a notification that messages have been received.

In one embodiment of the present invention, the personal computer 18 determines the set of functionality seen by the handset 14. These may include, for example, an address book or e-mail, or the like. Thus, a set of programs on the personal computer 18 are associated with particular handsets 14. In operation, selecting the PC function key 22 on the handset 14 establishes a connection to the personal computer 18 and causes a display on the handset 14 of a menu the personal computer 18 sends back, after having accessed its database of functionality. For example, the personal computer 18 may cause a menu of program selections to be displayed. The user may then select a program from the menu and activate it, causing another menu or messages to be provided from the personal computer 18. In the case on e-mail, for example, the handset will display incoming messages received from the personal computer 18. The handset 14 can then be used to input replies or new messages.

Turning now to FIG. 3, a block diagram of a handset 14 in accordance with an embodiment of the present invention is shown. The handset 14 includes a control processor 302, a transmitter 304, a receiver 306, memory 303, and a display 308. Also shown are the PC function key 22 and a cursor control 310. The control processor 302 supervises transmit and receive and interface functions. The memory 303 stores one or more programs used by the control processor 302. As discussed above, the PC function key 22 is used to activate a menu or interface 200 (FIG. 2) on the display 308 or establish or activate a connection to the personal computer 18, which then transmits the menu. The cursor control 310 may be used to scroll down or around on the display 308. Finally, a keypad (not shown) may be provided for keying in program commands or other text.

The PC function key 22 may activate a resident program on the handset 14 that displays the initial menu, and then establishes a connection to the personal computer for receiving further menus and display items from the personal computer 18. Alternatively, the PC function key 22 may cause the handset 14 to receive a menu over a previously open connection, i.e., cause the handset 14 to move from an idle state to an active state, and display a corresponding menu interface. In a still further embodiment, the selection of the PC function key 22 can cause a registration and connection with the personal computer 18 even if there had been none previously.

Further, in other embodiments, the PC function key 22 is used in the idle state when the handset 14 receives notices from the personal computer 18. Thus, for example, if an e-mail arrives at the personal computer 18, the personal computer 18 can notify the handset 14, such as via one or more signaling tones. The handset 14 signals the user, and the user can respond by selecting the PC function key 22.

It is noted that in certain embodiments, the PC function key may be illuminated, such as by a light emitting diode (LED). The illumination may be used to signal certain status information to the user, such as whether the computer is off, or whether an e-mail has been received at the personal computer. It is further noted that, while the PC function key is discussed herein primarily with regard to a handset or portable part, a similar PC function key may also be resident on the base station or fixed part.

FIG. 4 depicts an exemplary personal computer according to an embodiment of the present invention. As shown, the personal computer 18 includes a Home RF interface 24, though other wireless interfaces may be employed. The personal computer 18 further includes an interface control 26 and implements a variety of application programs 28.

The interface control 26 may be a program stored in memory (not shown) that interacts with applications programs 28 and the Home RF interface 24. The interface control 26 may maintain a database, for example, of the handsets 14 and functions associated with them.

In one embodiment, the interface control 26 receives incoming signals from the Home RF interface 24 and associates them with the corresponding applications programs 28. The interface control 26 then causes the program to activate. The interface control 26 then provides an interface between the application program and the particular handset 14, as will be described in greater detail below.

Alternatively the interface control 26 may maintain an active or idle connection to the handset 14 and provide a menu or other PC-controlled functionality to the user in response to the user selecting the PC function key 22. For example, in response to the particular PC function key signal, the interface control 26 may identify the handset 14, access the database of functions, and provide the associated menu.

The PC function key 22 may also be used in conjunction with alerting messages or signals. For example, if the personal computer 18 receives an e-mail for the user of the handset 14, the personal computer 18 can send the alerting signal. Such an alerting signal may be an audible signal, or vibratory signal for example. Further, as noted above, such an alerting signal may come in the form of an illumination of the PC function key itself. Thus, the PC function key may blink at a predetermined frequency responsive to receipt of an e-mail or other status information. The user can select the PC function key 22, which transmits a signal to the personal computer 18. In response, the personal computer sends the e-mail or one or more function menus.

Figure 5:
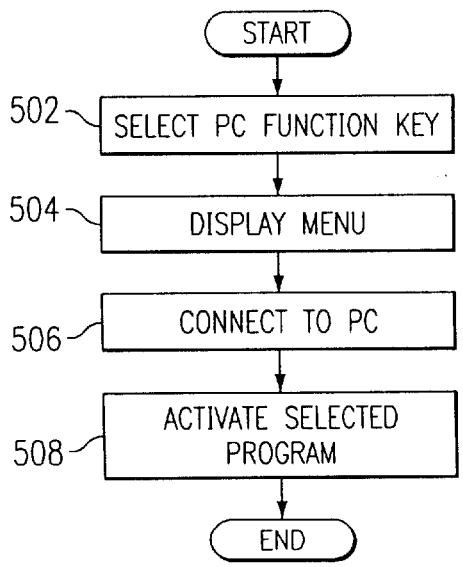
FIG. 5 is a flowchart illustrating operation of an embodiment of the present invention.

Turning now to FIG. 5, a flowchart illustrating operation of an embodiment of the present invention is shown. At step 502, a user selects the PC function key 22 on the appropriate handset 14. In a step 504, the handset 14 displays a menu of application programs with which the handset 14 can interact. In step 506, the user can select the appropriate program and thereby connect to the personal computer 18. The interface control 26 of the personal computer 218 receives the command and causes the application program to be activated, in step 508.

Figure 6:
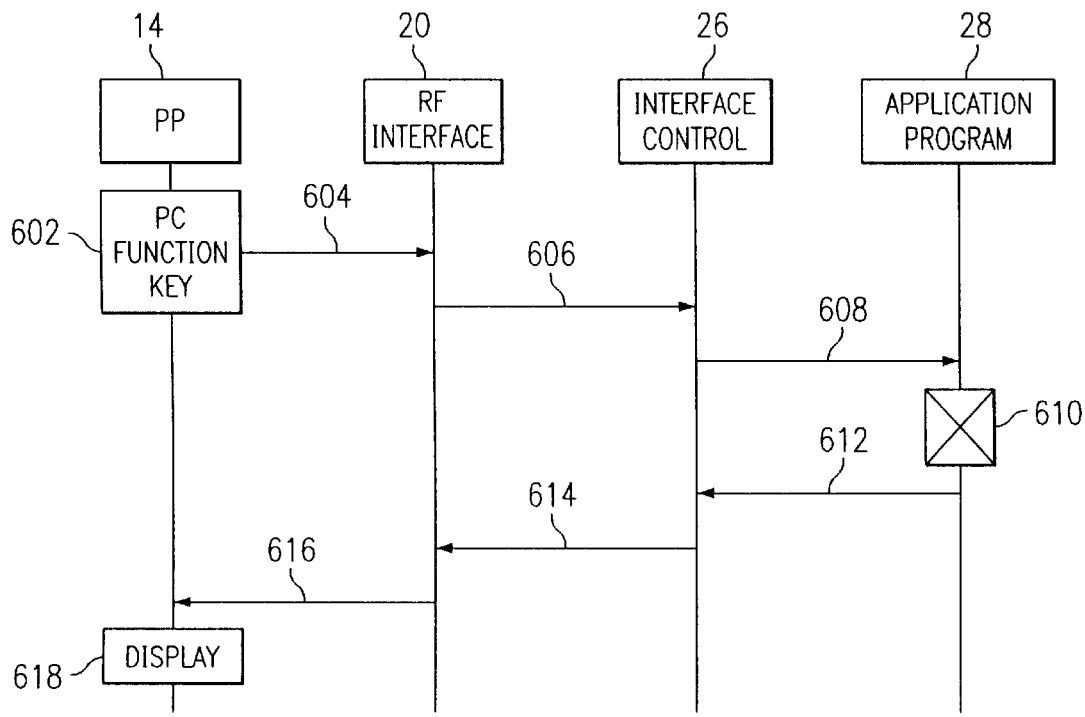
FIG. 6 is a diagram illustrating signal flow according to an embodiment of the present invention.

Signaling flow for an embodiment of the present invention is shown in FIG. 6. Shown are a handset 14, air interface 20, interface control 26, and application program 28. In operation, a user selects the PC function key 22 in 602, which causes the display menu to pop up and allow selection of a program. The selection of the PC function key 22 causes a command 604 to be sent to the air interface. The air interface receives the command, performs any filtering, demodulation, decoding, etc., and provides the command to the interface control 26 in 606. In 608, the interface control 26 translates the command, which identifies an application program as well as the source handset 14 which is to be opened. The interface control 26 then opens the application program 28, for example, by providing a signal or signals to the personal computer's operating system. Suitable operating systems include the Windows™ and Windows NT™ operating systems available from Microsoft Corporation.

In 610, the application program 28 opens and performs its functions. For example, an e-mail program may open and check for messages. In 612, a signal or signals indicative of a program result are sent to the interface control 26. The interface control 26 identifies the program and the initial requester (i.e., the destination of the results), and in 614 sends this to the air interface. The air interface then codes and modulates the data and transmits them to the portable part, in 616. In 618, the handset 14 displays the result.

Figure 7:
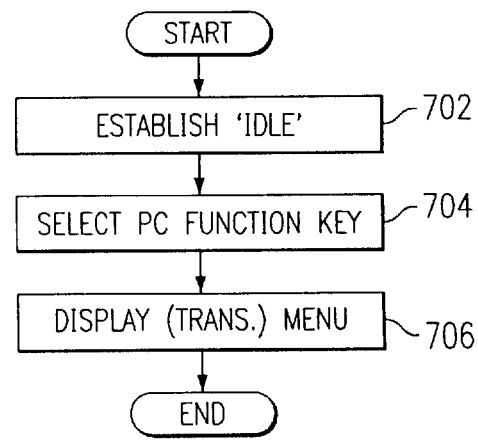
FIG. 7 is a flowchart illustrating operation of an embodiment of the present invention.

FIG. 7 is a flowchart illustrating operation of another embodiment of the present invention. In step 702, the handset 14 registers with the personal computer 20. In step 704, the user may select the PC function key 22 to begin an active connection with the personal computer 18. The personal computer 20 receives the function key signal and accesses a database of functions (not shown) to be provided the particular handset 14. In step 706, the personal computer 18 transmits the menu or other function indicia to the handset 14, which then displays them. It is noted that in other embodiments, the initial signal from the personal computer 18 is an acknowledge signal. The handset 14 then activates a stored menu, which can be used for further signaling with the personal computer 18. It is noted that, in other embodiments, selection of the PC function key 22 itself causes the registration with the personal computer.

Figure 8:
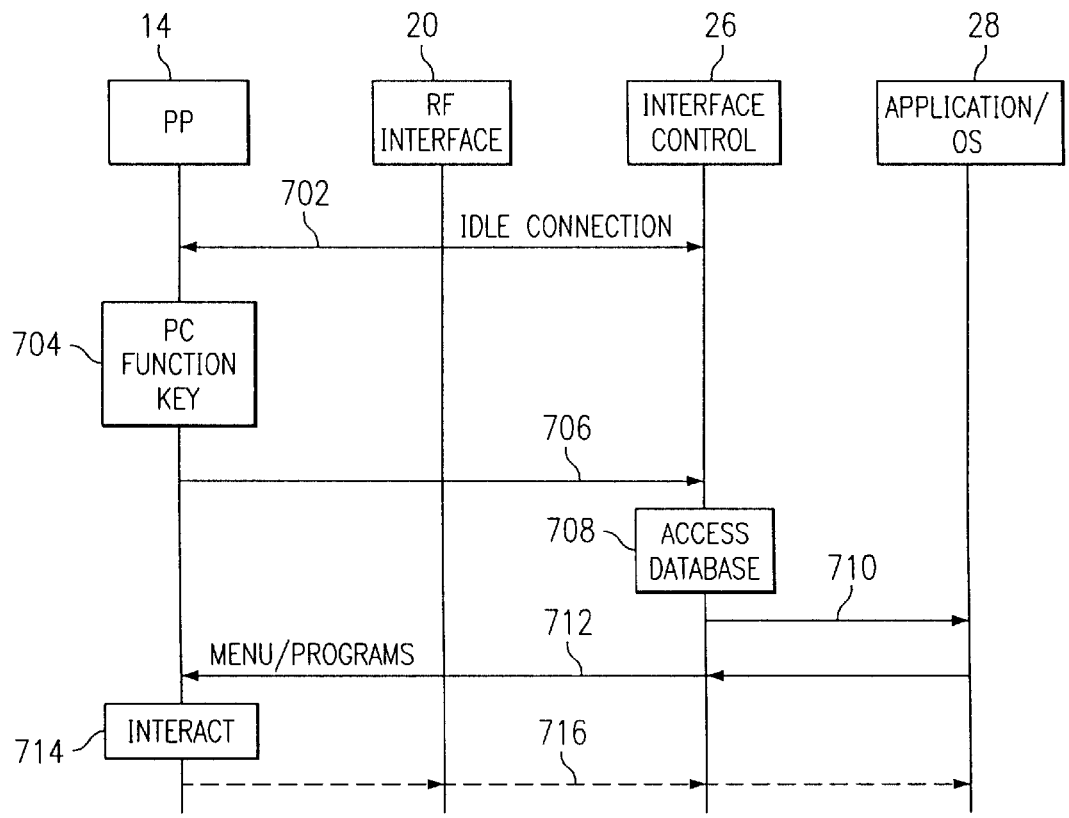
FIG. 8 is a diagram illustrating signal flow according to an embodiment of the present invention.

FIG. 8 is a diagram illustrating signaling flow for the embodiment of FIG. 7. As shown, in 702, the handset 14 and the personal computer 18 establish a registered connection. In 704, the PC function key 22 is depressed. In 706, the signal which is transmitted after the PC function key 22 has been depressed is transmitted to the interface control 26. In response, in 708, the interface control 26 accesses the database to determine which set of functions are to be used with the particular handset 14 and, in 710, activates the corresponding program. In 712, the program sends the appropriate menu set (or acknowledgement) to the handset 14. In 714, the handset 14 can then interact with the program, using signaling 716.

Figure 9:
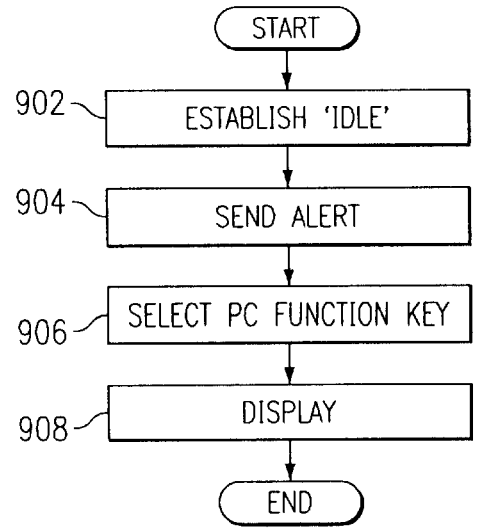
FIG. 9 is a flowchart illustrating operation of an embodiment of the present invention.

FIG. 9 is a flowchart illustrating operation of another embodiment of the present invention. In step 902, the handset 14 is registered with the personal computer 20. In step 904, the personal computer 18 receives an update or message, such as from an external source, which must be sent to the handset 14. This may include, for example, an e-mail message. The personal computer 18 sends an alerting signal to the handset 14, such as an audible signal or a blinking of the PC function key 22. In step 906, the handset 14 signals and the user selects the PC function key 22. In step 908, the personal computer 18 receives the signal from the PC function key 22 and sends the received message, which is displayed.

Figure 10:
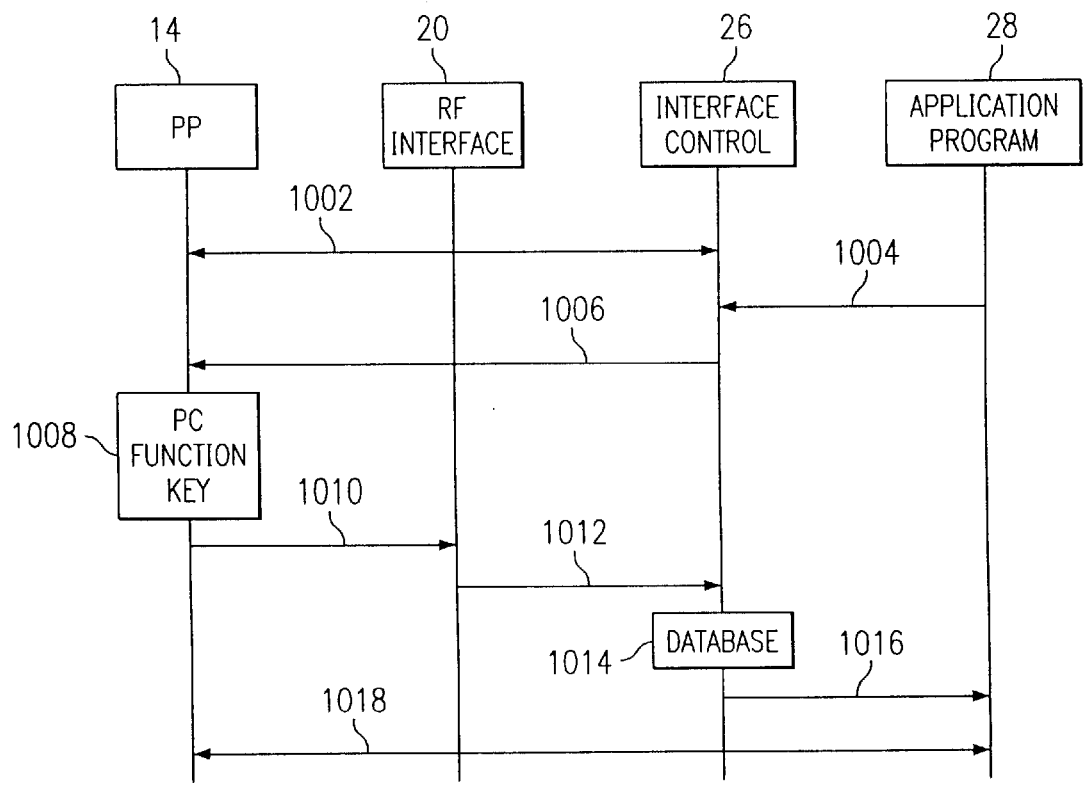
FIG. 10 is a diagram illustrating signal flow according to an embodiment of the present invention.

FIG. 10 is a diagram illustrating signal flow for the embodiment of FIG. 9. In 1002, the handset 14 and the interface control 26 establish registration. In 1004, the application program 28 has an alert for the handset 14 and signals the interface control 26. In 1006, the interface control 26 identifies the destination handset 14 and sends an alerting signal. In 1008, the PC function key 22 is activated by the user. A signal is sent from the handset 14 to the personal computer 18 in 1010. In 1012, the received signal is processed by the RF interface 24 and provided to the interface control 26. In 1014, the interface control 26 accesses the database to determine the associated program or functions and, in 1016, provides the signaling to that program. Finally, in 1018, the program and handset 14 interact.

The invention described in the above detailed description is not intended to be limited to the specific form set forth herein, but is intended to cover such alternatives, modifications and equivalents as can reasonably be included within the spirit and scope of the appended claims.

What is claimed is:

1. A cordless telephone, comprising:
   a wireless computer interface adapted to interface to a personal computer; and
   at least one user interface key adapted to supervise communicating over said wireless computer interface;
   wherein activating said at least one user interface key causes said personal computer to download a list of menu options to said cordless telephone, said list comprising a list of programs accessible on said personal computer.

2. A cordless telephone according to claim 1, wherein said at least one user interface key is adapted to control a menu screen on said cordless telephone for selecting corresponding programs on said personal computer.

3. A cordless telephone according to claim 2, further comprising an alerting controller for providing an alert responsive to a predetermined condition on said personal computer.

4. A cordless telephone according to claim 3, said at least one user interface key adapted to supervise controlling one or more programs on said computer.

5. A cordless telephone according to claim 4, said one or more programs including an e-mail program.

6. A cordless telephone according to claim 4, said one or more programs including a Web browser.

7. A cordless telephone in accordance with claim 3, said alerting controller being user programmable.

8. A method, comprising:
   providing a computer having a wireless interface;
   providing a cordless telephone system having a wireless computer interface and
   adapted to interface to said wireless interface; and
   providing at least one user interface key on said cordless telephone system, wherein said at least one user interface key is adapted to supervise communicating with said wireless interface;
   wherein activating said at least one user interface key causes said personal computer to download a list of menu options to said cordless telephone, said list comprising a list of programs accessible on said personal computer.

9. A method in accordance with claim 8, wherein said at least one user interface key is adapted to control a menu screen on said cordless telephone system for selecting corresponding programs on said computer.

10. A method in accordance with claim 9, further comprising providing an alerting controller on said cordless telephone system for providing an alert responsive to a predetermined condition on said computer.

11. A method in accordance with claim 10, said alerting controller being user programmable.

12. A method in accordance with claim 8, said at least one user interface key adapted to supervise controlling one or more programs on said computer.

13. A method in accordance with claim 12, said one or more programs including an e-mail program.

14. A method in accordance with claim 12, said one or more programs including a Web browser.

15. A system, comprising:
    a computer having a wireless interface;
    a cordless telephone system having a wireless computer interface and adapted to interface to said wireless interface; and
    at least one user interface key on said cordless telephone system, wherein said at least one user interface key is adapted to supervise communicating with said wireless interface;
    wherein activating said at least one user interface key causes said computer to download a list of menu options to said cordless telephone, said list comprising a list of programs accessible on said computer.

16. A system in accordance with claim 15, wherein said at least one user interface key is adapted to control a menu screen on said cordless telephone system for selecting corresponding programs on said computer.

17. A system in accordance with claim 16, further comprising an alerting controller on said cordless telephone system for providing an alert responsive to a predetermined condition on said computer.

18. A system in accordance with claim 17, said alerting controller being user programmable.

19. A system in accordance with claim 15, said at least one user interface key adapted to supervise controlling one or more programs on said computer.

20. A system in accordance with claim 19, said one or more programs including an e-mail program.

21. A system in accordance with claim 19, said one or more programs including a Web browser.

22. A cordless telephone, comprising:
    a wireless computer interface adapted to interface to a personal computer; and
    at least one user interface key adapted to supervise communicating over said wireless computer interface; and
    an alerting controller for providing an alert responsive to a change in condition of a user-accessible program on said personal computer;
    wherein activating said at least one user interface key causes said personal computer to download a list of menu options to said cordless telephone, said list comprising a list of programs accessible on said personal computer.

23. A cordless telephone, comprising:
    a wireless computer interface adapted to interface to a personal computer; and
    at least one user interface key adapted to supervise communicating over said wireless computer interface; and
    an alerting controller for providing an alert responsive to a change in condition of a user-accessible program on said personal computer;
    wherein activating said at least one user interface key causes said personal computer to download a list of menu options to said cordless telephone, said list comprising a list of programs accessible on said personal computer and selectable by said personal computer.

* * * * *